(12) United States Patent
Fang

(10) Patent No.: US 12,502,463 B2
(45) Date of Patent: Dec. 23, 2025

(54) MILK BOWL FOR BREAST PUMP AND BREAST PUMP

(71) Applicant: Guofeng Fang, Ningbo (CN)

(72) Inventor: Guofeng Fang, Ningbo (CN)

( * ) Notice: Subject to any disclaimer, the term of this patent is extended or adjusted under 35 U.S.C. 154(b) by 557 days.

(21) Appl. No.: 17/998,036

(22) PCT Filed: May 20, 2021

(86) PCT No.: PCT/CN2021/094780
§ 371 (c)(1),
(2) Date: Nov. 6, 2022

(87) PCT Pub. No.: WO2021/233364
PCT Pub. Date: Nov. 25, 2021

(65) Prior Publication Data
US 2023/0173149 A1    Jun. 8, 2023

(30) Foreign Application Priority Data

May 21, 2020   (CN) .......................... 202010435370.3

(51) Int. Cl.
*A61M 1/06*         (2006.01)
(52) U.S. Cl.
CPC .................................. *A61M 1/064* (2014.02)
(58) Field of Classification Search
CPC ........ A61M 1/06; A61M 1/062; A61M 1/064;
A61M 1/066; A61M 1/067
See application file for complete search history.

(56) References Cited

U.S. PATENT DOCUMENTS

| | | |
|---|---|---|
| 10,258,723 B2 | 4/2019 | Health |
| 2002/0198489 A1 | 12/2002 | Silver |

(Continued)

FOREIGN PATENT DOCUMENTS

| | | |
|---|---|---|
| CN | 205913572 U | 2/2017 |
| CN | 206473606 U | 9/2017 |

(Continued)

OTHER PUBLICATIONS

International Search Report PCT/CN2021/094780, Mailed Aug. 18, 2021.

*Primary Examiner* — Rebecca E Eisenberg
(74) *Attorney, Agent, or Firm* — Zhigang Ma

(57) ABSTRACT

The present disclosure provides a milk bowl for a breast pump and the breast pump, aiming to solve the problems that components of a breast pump in the prior art are relatively scattered and the breast pump occupies a relatively large space. The milk bowl includes a bowl body, a milk storage cavity and a tee joint are disposed in the bowl body, a milk outlet is provided at a front end of the milk storage cavity, and the tee joint is located in the milk storage cavity; three ports of the tee joint are a milk pumping port, a milk flowing port and a negative pressure port respectively, the negative pressure port of the tee joint and the bowl body are integrated, and the negative pressure port of the tee joint is in communication with the outside. The breast pump includes the above milk bowl for a breast pump and a main unit; the main unit includes a shell; the main unit is disposed in a space formed by a rear side of a semicircular mounting plate and an upper side of an upper panel of the bowl body, and the shell of the main unit and the bowl body together form a hemispherical surface. The tee joint and the bowl body are integrated, thus saving space, reducing a volume, achieving a high degree of integration, and implementing a simple, efficient and low-cost solution for a concealed breast pump.

10 Claims, 15 Drawing Sheets

(56) References Cited

U.S. PATENT DOCUMENTS

2015/0217034 A1    8/2015   Pollen
2018/0008758 A1*   1/2018   Garbez ................ A61M 39/22

FOREIGN PATENT DOCUMENTS

| CN | 109621041 A | | 4/2019 | |
|----|-------------|---|--------|---|
| CN | 109621044 A | * | 4/2019 | .............. A61M 1/06 |
| CN | 209033304 U | | 6/2019 | |

* cited by examiner

MILK BOWL FOR BREAST PUMP AND BREAST PUMP

CROSS-REFERENCE TO RELATED APPLICATIONS

This application is a 371 of International Patent Application Number PCT/CN2021/094780, filed on May 20, 2021, which claims the benefit and priority of Chinese Patent Application Number 202010435370.3, filed on May 21, 2020 with China National Intellectual Property Administration, the disclosures of which are incorporated herein by reference in their entireties.

TECHNICAL FIELD

The present disclosure belongs to the technical field of breast pumps, in particular to a milk bowl for a breast pump and the breast pump.

DESCRIPTION OF RELATED ART

A breast pump is used to squeeze out breast milk accumulated in breasts, especially when a baby cannot suck the breast directly. Breakthroughs in technology and continuous increase of mothers' requirements for milk pumping give birth to several kinds of built-in concealed electric breast pumps for milk pumping. However, they are relatively scattered in components and are complex in processes, resulting in high costs and difficult broad popularization, or they occupy large space, causing poor portability and use and mounting inconvenience and low possibility in quantity production at low costs.

SUMMARY

The present disclosure provides a milk bowl for a breast pump and the breast pump, aiming to solve the problems that components of a breast pump in the prior art are relatively scattered and the breast pump occupies a relatively large space.

In order to solve the above technical problems, a technical solution adopted by the present disclosure is as follows:
a milk bowl for a breast pump includes a bowl body, a milk storage cavity and a tee joint are disposed in the bowl body, a milk outlet is disposed at a front end of the milk storage cavity, and the tee joint is located in the milk storage cavity; three ports of the tee joint are a milk pumping port, a milk flowing port and a negative pressure port respectively, and the negative pressure port of the tee joint and the bowl body are integrated.

Further, the milk bowl for a breast pump further includes a pumping nozzle, the pumping nozzle is in a shape of a horn reduced from front to back, and a rear port of the pumping nozzle is hermetically connected to and in communication with the milk pumping port of the tee joint; and a front end of the pumping nozzle is detachably connected to a front end of the bowl body, and the pumping nozzle hermetically blocks the milk outlet of the milk storage cavity.

In the present disclosure, the front end of the pumping nozzle is detachably connected to the front end of the bowl body, and the pumping nozzle hermetically blocks the milk outlet of the milk storage cavity. On the one hand, the pumping nozzle and the bowl body are integrated together to save the space. On the other hand, the pumping nozzle may be used as an end cover at the milk outlet of the milk storage cavity besides milk pumping, thus facilitating milk pumping, reducing parts, further optimizing the space and achieving a high degree of integration. In addition, the pumping nozzle may be changed in size, thus improving universality.

Further, the bowl body is composed of an upper panel, a lower arc plate and a rear end plate, the front end of the bowl body is a semicircular milk outlet, a semicircular mounting plate extends upward from the milk outlet, an edge of the semicircular mounting plate and a front edge of the arc plate together form an annular edge. and a front end of the pumping nozzle is detachably connected to the annular edge of the bowl body.

By using the structure, a space for mounting a main unit is formed on a rear side of the semicircular mounting plate and an upper side of the upper panel of the bowl body, such that the overall structure is relatively compact. In addition, the front end of the bowl body is the semicircular milk outlet, and the front end of the whole milk storage cavity is the milk outlet, thus facilitating cleaning of the milk storage cavity.

Further, the tee joint is located at a junction of the upper panel and the rear end plate; an opening of the milk pumping port is disposed forward; an opening of the milk flowing port is disposed obliquely downward, horizontally forward or vertically downward; an opening of the negative pressure port faces upward and penetrates the upper panel, an opening edge of the negative pressure port and the upper panel are are integrated, the rear end face of the negative pressure port and the rear end plate are integrated, and the milk pumping port and the milk flowing port are suspended in the milk storage cavity; and the negative pressure port is internally provided with an airbag slot.

The opening of the milk flowing port is disposed obliquely downward at a best angle; on the one hand, milk may not accumulate in the milk flowing port; on the other hand, when a duckbill valve is connected, the duckbill valve may be placed at a lower position, and may not be deformed due to collision with an inner wall of the milk storage cavity during rotation; the duckbill valve may be placed at the lower position, thereby increasing a depth of the airbag slot, increasing a deformation space of an airbag and improving milk pumping force and effect; and in addition, when the opening of the milk flowing port is disposed obliquely downward, a cleaning dead angle may be avoided, and cleaning is facilitated.

Further, the annular edge is folded outward to form an annular convex edge, an edge of the front end of the pumping nozzle is folded outward to form an annular clamping recess with a U-shaped cross section, and the annular clamping recess is hermetically clamped on the annular convex edge; and a receding recess matching the outer wall of the pumping nozzle is disposed on each of the front surface of the semicircular mounting plate and the inner surface of the upper panel of the bowl body. The pumping nozzle is made of elastic rubber; and a gap is reserved between the pumping nozzle and an inner wall of the bowl body.

The pumping nozzle is made of elastic rubber, so as to be more comfortable for a user to wear; the gap reserved between the pumping nozzle and the inner wall of the bowl body provides a deformation space for the pumping nozzle, and the user may make certain adjustment according to the shape of her/his breast; the edge of the front end of the pumping nozzle is detachably and hermetically connected to the edge of the front end of the bowl body by the annular clamping recess and the annular convex edge, thereby facilitating opening of the milk outlet and taking-out of the breast milk.

Further, a one-way diaphragm valve is disposed at the milk flowing port of the tee joint. It may prevent the breast milk in the milk storage cavity from splashing out from the milk flowing port due to shaking.

Further, a duckbill valve made of rubber is disposed on the milk flowing port of the tee joint. It may prevent the breast milk in the milk storage cavity from splashing out from the milk flowing port due to shaking.

On the other hand, the present disclosure further discloses a breast pump, including the above milk bowl for a breast pump and a main unit; the main unit includes a shell; the main unit is disposed in a space formed by a rear side of a semicircular mounting plate and an upper side of an upper panel of a bowl body, and the shell of the main unit and the bowl body together form a hemispherical surface.

In this solution, the main unit is disposed in the space formed by the rear side of the semicircular mounting plate and the upper side of the upper panel, and the shell of the main unit and the bowl body together form a hemispherical surface; on the one hand, the position setting of the main unit makes the overall structure compact, saves space and facilitates the usage; on the other hand, the shell of the main unit and the bowl body together form a hemispherical surface, such that the breast pump is convenient for the user to wear, may be held by one hand for operation, and may also be placed in a bra with desirable concealment.

Further, the main unit further includes an L-shaped mounting seat composed of a front panel and a bottom panel, the front panel of the mounting seat is attached to the semicircular mounting plate of the bowl body, and a bottom surface of the mounting seat is attached to the upper side of the upper panel of the bowl body; a mounting cavity is formed between the mounting seat and the shell, and a control main board, a power supply, a negative pressure device, an air release valve and an airbag are disposed in the mounting cavity; a negative pressure port is an airbag slot, an opening is disposed at an upper end of the airbag, the opening is folded outward with a circle of elliptical clamping recess with a U-shaped cross section, and the elliptical clamping recess at the opening of the airbag is clamped at an upper end edge of an opening of the negative pressure port; a pressure frame is disposed on a lower surface of the mounting seat, a groove is provided around the pressure frame, the pressure frame is hermetically inserted in the opening of the airbag and the upper end of the airbag is hermetically inserted in the groove; an air pipe of the air release valve and an air pipe of the negative pressure device pass through the pressure frame to be in communication with the interior of the airbag; the power supply, the negative pressure device and the air release valve are all connected to the control main board, and an operation key module located on an upper surface of the shell is disposed on the control main board; the air release valve and the negative pressure device are in communication with the airbag by means of the air pipes, and the airbag is located in the negative pressure port and seals the opening of the negative pressure port; and reinforcing ribs are disposed on an inner side wall of the airbag.

By controlling operation of the negative pressure device and the air release valve with the control main board, the airbag is controlled to be evacuated or introduce air; when the breast milk needs to be pumped, the pumping nozzle covers the breast, the airbag is evacuated, then the airbag is in a flat state and reduced in volume, and negative pressure is generated between the pumping nozzle and the breast to pump breast milk; when air enters the airbag, the airbag recovers under the action of its own elasticity and air pressure, and the recovery effect of the airbag is better by means of the reinforcing ribs.

The pressure frame not only fixes the airbag in the airbag slot and seals the airbag, but also positions and limits the main unit in front, back, left and right directions, and when tightly inserted in the opening of the airbag, the pressure frame further fixes the main unit and the breast pump, so as to facilitate disassembly and assembly.

Further, the operation key module includes an on-off key, a plus key and a minus key, the power supply is a lithium battery, and the lithium battery is connected to a power port.

The present disclosure has the following beneficial effects:

In the present disclosure, the tee joint and the bowl body are integrally disposed, compared with the prior art in which a tee joint and a bowl body are assembled together, the structure is simpler, the space is saved, the volume is reduced, and a simple, efficient and low-cost solution for a concealed breast pump is implemented; and in addition, disassembly and assembly are facilitated, the structure is more compact, the gap generated by assembly is reduced, breeding bacteria are avoided, and cleaning is facilitated. By means of communication of the negative pressure port with the negative pressure device, the pumping nozzle may pump milk out by means of negative pressure, and the pumped milk may flow into the milk storage cavity by means of the milk flowing port, so the structure is compact, the degree of integration is high, and usage is convenient.

BRIEF DESCRIPTION OF THE DRAWINGS

In order to illustrate the technical solutions in the embodiments of the present disclosure more clearly, a brief introduction will be made below to the accompanying drawings required in the embodiments. It should be understood that the accompanying drawings described below show merely some embodiments of the present disclosure and should not be regarded as limiting the scope, and other relevant accompanying drawings can also be derived according to these accompanying drawings by those of ordinary skill in the art without any creative efforts.

REFERENCE NUMERALS

1—bowl body; 11—milk storage cavity; 12—semicircular mounting plate; 13—annular convex edge; 14—upper panel; 15—arc plate; 16—rear end plate; 17—receding recess; 2—pumping nozzle; 21—annular clamping recess; 3—airbag; 31—elliptical clamping recess; 4—duckbill valve; 51—milk pumping port; 52—negative pressure port; 521—clamping block; 53—milk flowing port; 6—main unit; 61—shell; 62—key module; 63—charging port; 64—air nozzle; 65—power supply; 66—negative pressure device; 67—control main board; 68—air release valve; 71—pressure frame; 72—groove; and 8—mounting seat.

DESCRIPTION OF THE EMBODIMENTS

The technical solutions in embodiments of the present disclosure will be described clearly and completely below with reference to accompanying drawings in the embodiments of the present disclosure. It should be understood that specific embodiments described herein are merely used to explain the present disclosure, but not to limit the present disclosure. All other embodiments derived by those skilled in the art based on the embodiments of the present disclosure without any creative efforts shall fall within the protection scope of the present disclosure.

Embodiment 1

Figure 1:
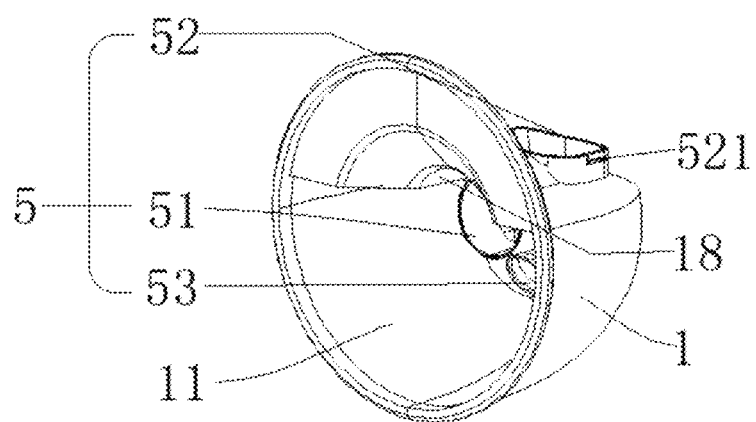
FIG. 1 is a schematic structural diagram of a bowl body from a first perspective in the present disclosure.
Figure 2:
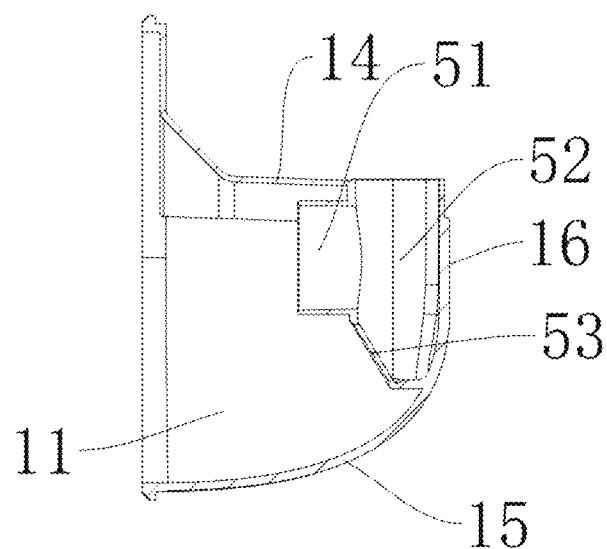
FIG. 2 is a schematic structural diagram of a sectional view of the bowl body in the present disclosure.

With reference to FIGS. 1 and 2, a milk bowl for a milk pump includes a bowl body 1, a milk storage cavity 11 and a tee joint are disposed in the bowl body 1, a milk outlet is disposed at a front end of the milk storage cavity 11, and the tee joint is located in the milk storage cavity 11; and three ports of the tee joint are a milk pumping port 51, a milk flowing port 53 and a negative pressure port 52 respectively, and the negative pressure port 52 of the tee joint and the bowl body are integrated.

With reference to FIGS. 1 to 7, on the basis of the above solution, the milk bowl for a milk pump further includes a pumping nozzle 2, the pumping nozzle 2 is in a shape of a horn reduced from front to back, and a rear port of the pumping nozzle 2 is hermetically connected to and in communication with the milk pumping port 51 of the tee joint. In a specific way, the pumping nozzle 2 is a rubber part, and the rear port of the pumping nozzle 2 is tightly sleeved on the milk pumping port 51 of the tee joint. A front end of the pumping nozzle 2 is detachably connected to the annular edge of the bowl body, and the pumping nozzle 2 hermetically blocks the milk outlet of the milk storage cavity 11.

The front end of the pumping nozzle 2 is detachably connected to a front end of the bowl body, and the pumping nozzle hermetically blocks the milk outlet of the milk storage cavity.

Figure 3:
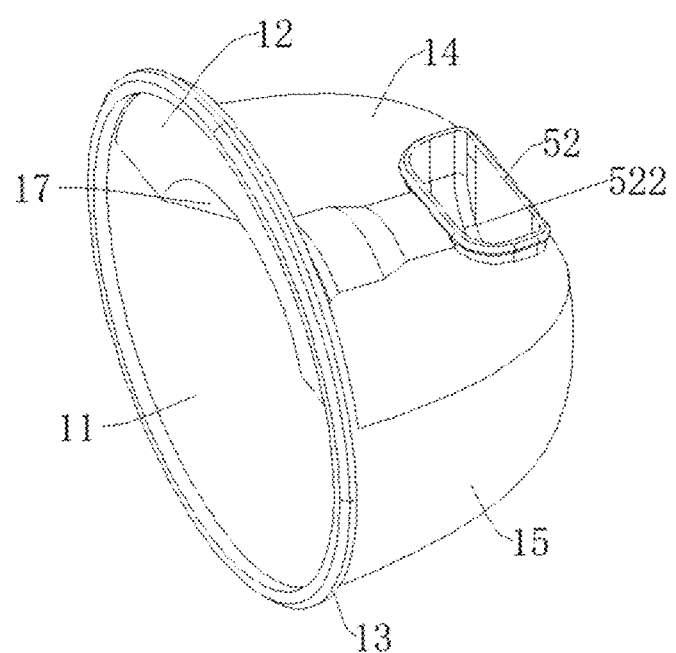
FIG. 3 is a schematic structural diagram of a bowl body from a second perspective in the present disclosure.
Figure 4:
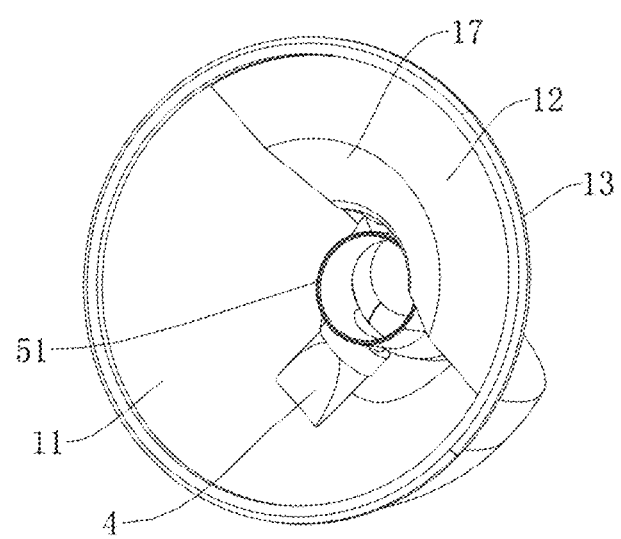
FIG. 4 is a schematic structural diagram of another bowl body in the present disclosure.
Figure 5:
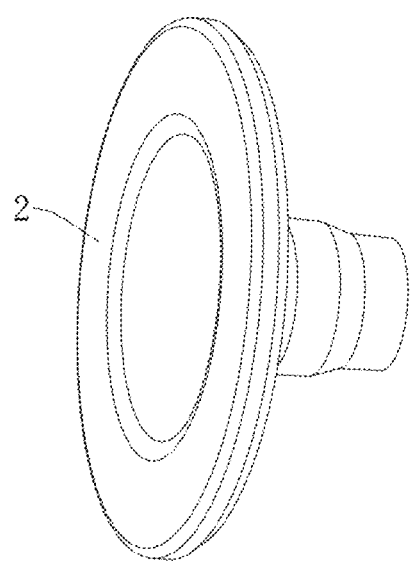
FIG. 5 is a schematic structural diagram of a pumping nozzle in the present disclosure.

With reference to FIGS. 2 and 3, on the basis of the above solution, as a feasible structure, the bowl body is composed of an upper panel 14, a lower arc plate 15 and a rear end plate 16. In order to improve wearing comfort, the lower arc plate 15 and the rear end plate 16 are in a smooth transition. The front end of the bowl body is a semicircular milk outlet; a semicircular mounting plate 12 extends upward from the milk outlet; an edge of the semicircular mounting plate 12 and a front edge of the arc plate 15 together form an annular edge; and a front end of the pumping nozzle 2 is detachably connected to the annular edge of the bowl body 1. The upper panel 14 is preferably a flat plate, and the rear end plate 16 may be a flat plate, or a convex plate forming a ¼ spherical surface together with the arc plate 15.

With reference to FIGS. 1 to 3, on the basis of the above solution, the tee joint is located at a junction of the upper panel 14 and the rear end plate 16; an opening of the milk pumping port 51 is disposed forward; an opening of the milk flowing port 53 is disposed obliquely downward (as in FIGS. 1 to 3), horizontally forward (not shown) or vertically downward (as in FIG. 4); an opening of the negative pressure port 52 faces upward and penetrates the upper panel 14, an opening edge of the negative pressure port 52 and the upper panel 14 are integrated, a rear end face of the negative pressure port 52 and the rear end plate 16 are integrated, and the milk pumping port 51 and the milk flowing port 53 are suspended in the milk storage cavity 11; and the negative pressure port 52 is internally provided with an airbag slot. In order to improve firmness of airbag connection, a clamping block 521 may be disposed on an outer side wall of the opening of the negative pressure port 52.

Figure 6:
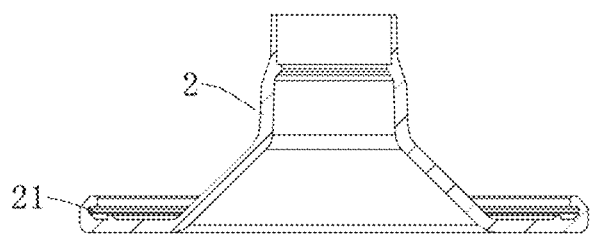
FIG. 6 is a schematic structural diagram of a sectional view of the pumping nozzle in the present disclosure.
Figure 7:
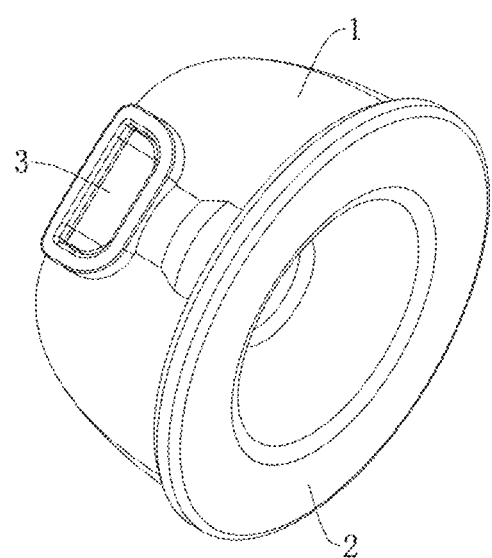
FIG. 7 is a schematic structural diagram of a bowl body equipped with the pumping nozzle and an airbag in the present disclosure.

With reference to FIGS. 3, 6 and 7, on the basis of the above solution, the front end of the pumping nozzle 2 is detachably connected to the annular edge of the bowl body 1. In a specific implementation, the annular edge is folded outward to form an annular convex edge 13, an edge of the front end of the pumping nozzle 2 is folded outward to form an annular clamping recess 21 with a U-shaped cross section, and the annular clamping recess 21 is hermetically clamped on the annular convex edge 13. A receding recess 17 matching the outer wall of the pumping nozzle 2 is disposed on each of the front surface of the semicircular mounting plate 12 and the inner surface of the upper panel 14 of the bowl body.

On the basis of the above solution, the pumping nozzle 2 is made of elastic rubber; a gap is reserved between the pumping nozzle 2 and an inner wall of the bowl body; the edge of the front end of the pumping nozzle 2 is folded outward to form an annular clamping recess 21 with a U-shaped cross section, the front edge of the bowl body is provided with an annular convex edge 13, and the annular clamping recess 21 is hermetically clamped on the annular convex edge 13.

Figure 8:
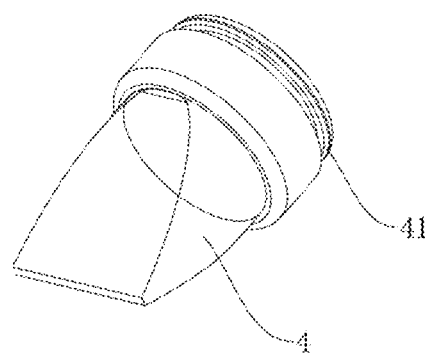
FIG. 8 is a schematic structural diagram of a duckbill valve in the present disclosure.

With reference to FIG. 8, on the basis of the above solution, a duckbill valve 4 made of rubber is disposed on the milk flowing port of the tee joint. Specifically, as one implementation, with reference to FIGS. 1, 2 and 8, the milk flowing port 53 of the tee joint is an opening disposed in front of a bottom of the airbag slot, an upper end of the duckbill valve 4 is a circular pipe clamped on the milk flowing port 53, and a clamping recess 41 for clamping on the milk flowing port 53 is disposed at a top end of the circular pipe; a lower portion is a flat pipe with a gradually reduced cross section; and an opening of the duckbill valve 4 is disposed obliquely forward. Alternatively, with reference to FIG. 4, the milk flowing port 53 is a conduit, an upper end of the duckbill valve 4 is a circular pipe sleeveing the milk flowing port 53, and the lower portion is a flat pipe with a gradually reduced cross section. In a negative pressure state, the air pressure in the tee joint is lower than that in the milk storage cavity 11, so the duckbill valve 4 is in a closed state. In a non-negative pressure state, the duckbill valve 4 may cause breast milk to flow into the milk storage cavity 11.

Figure 9:
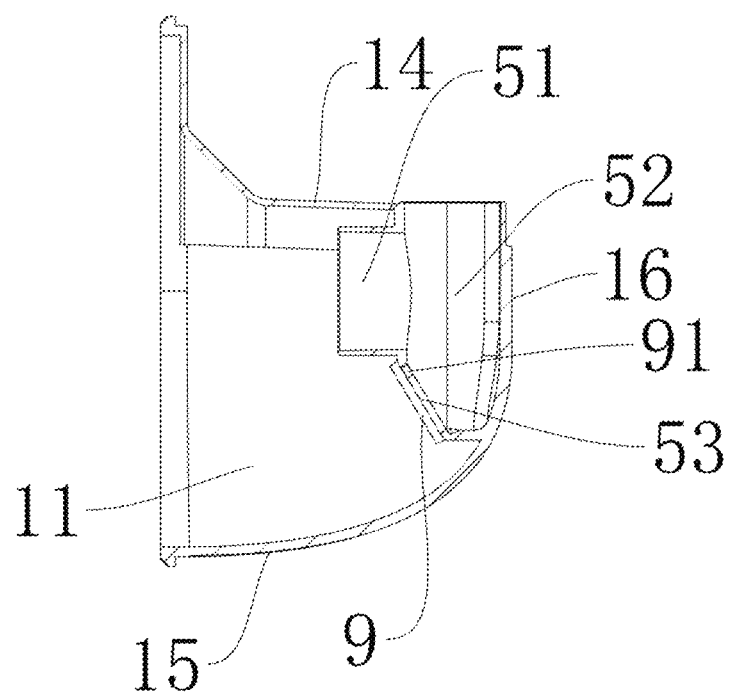
FIG. 9 is a schematic structural diagram of a sectional view of a bowl body with a duckbill valve replaced with a one-way diaphragm valve in the present disclosure.
Figure 10:
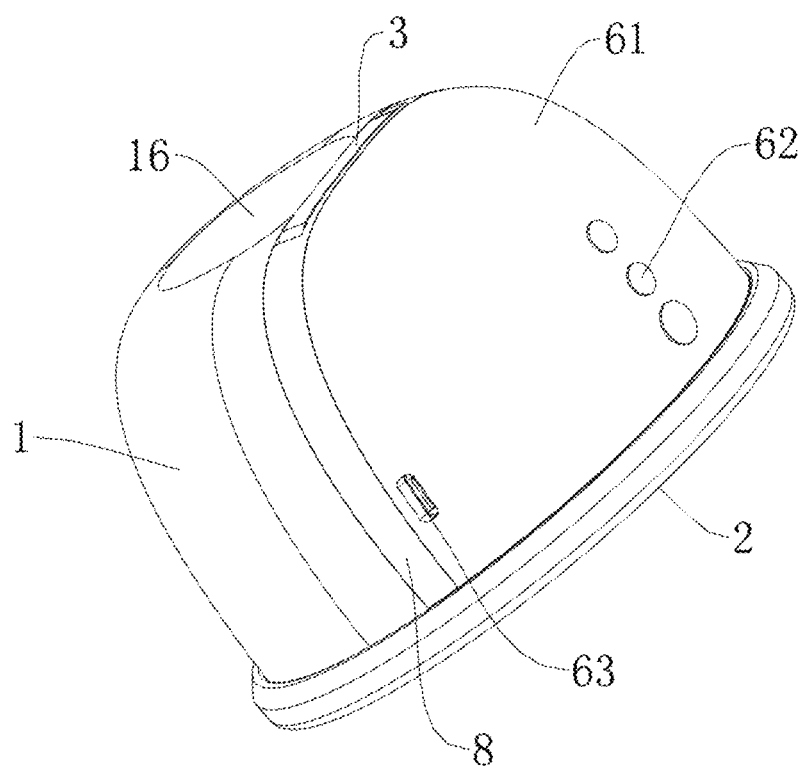
FIG. 10 is a schematic structural diagram of a breast pump from a first perspective in the present disclosure.
Figure 11:
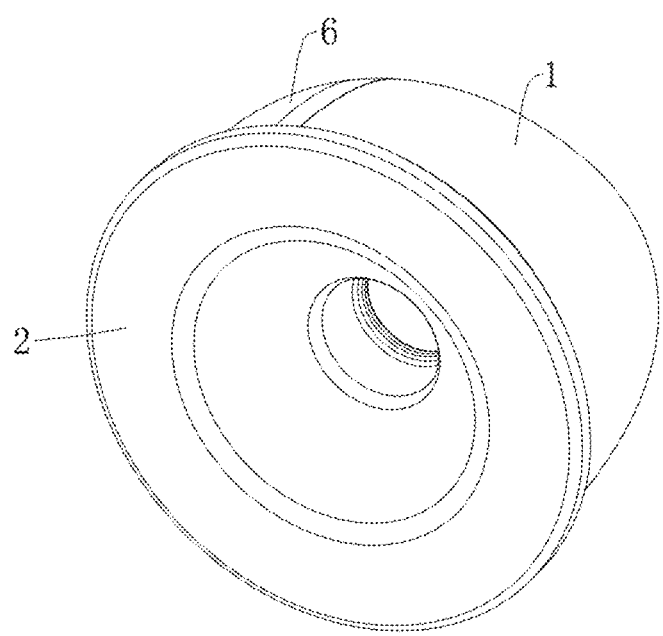
FIG. 11 is a schematic structural diagram of the breast pump from a second perspective in the present disclosure.
Figure 12:
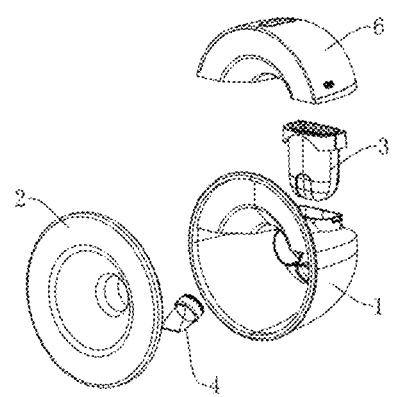
FIG. 12 is a schematic structural diagram of an exploded view of the breast pump in the present disclosure.

With reference to FIG. 9, in addition to the duckbill valve 4, a one-way diaphragm valve may also be disposed at the milk flowing port 53 of the tee joint. As a practical and non-exclusive structure, the one-way diaphragm valve is composed of a rubber diaphragm 9 and a plug 91 disposed on the rubber diaphragm 9, an insertion hole closely matching the plug 91 is provided on the milk flowing port 53, and a rubber diaphragm support frame is disposed on the milk flowing port 53. In a negative pressure state, the air pressure in the tee joint is lower than that in the milk storage cavity 11, so the rubber diaphragm 9 fits and blocks the milk flowing port. In a non-negative pressure state, the rubber diaphragm 9 is pressed open under the action of breast milk gravity, so that breast milk may flow into the milk storage cavity 11.

Embodiment 2

With reference to FIGS. 2, 10, 11 and 12, a breast pump includes the milk bowl for a breast pump as described in Embodiment 1 and a main unit 6; the main unit 6 includes a shell 61; the main unit 6 is disposed in a space formed by a rear side of a semicircular mounting plate 12 and an upper side of an upper panel 14 of a bowl body, and the shell 61 of the main unit 6 and the bowl body together form a hemispherical surface.

With reference to FIG. 2 and FIGS. 10 to 15, on the basis of the above solution, the main unit 6 further includes an L-shaped mounting seat 8 composed of a front panel and a bottom panel, the front panel of the mounting seat 8 is attached to the semicircular mounting plate 12 of the bowl body, and a bottom surface of the mounting seat 8 is attached to the upper side of the upper panel 14 of the bowl body.

With reference to FIGS. 1 to 15, a mounting cavity is formed between the mounting seat 8 and the shell 61, and a control main board 67, a power supply 65, a negative pressure device 66, an air release valve 68 and an airbag 3 are disposed in the mounting cavity; the airbag 33 is a U-shaped recess and has an upper end opened; an opening is disposed at the upper end of the airbag 3, the opening is folded outward to form a circle of elliptical clamping recess 31 with a U-shaped cross section, and an elliptical clamping recess 31 at the opening of the airbag 3 is clamped at the upper end edge of the opening of the negative pressure port 52; a pressure frame 71 is disposed on a lower surface of the mounting seat 8, a groove 72 is provided around the pressure frame 71, the pressure frame 71 is hermetically inserted in the opening of the airbag 3 and the upper end of the airbag 3 is hermetically inserted in the groove 72; an air pipe of the air release valve 68 and an air pipe of the negative pressure device 66 pass through the pressure frame 71 to be in communication with the interior of the airbag 3; the power supply 65, the negative pressure device 66 and the air release valve 68 are all connected to the control main board 67, and an operation key module 62 located on an upper surface of the shell 61 is disposed on the control main board 67. The control main board 67 is the same as the control main board 67 of the existing electric breast pump, and details are not described herein again.

The air release valve 68 and the negative pressure device 66 are both in communication with the airbag 3 by means of the air pipes, and the airbag 3 is located in the negative pressure port 52 and seals the opening of the negative pressure port 52.

Reinforcing ribs are disposed on an inner side wall of the airbag 3.

Figure 13:
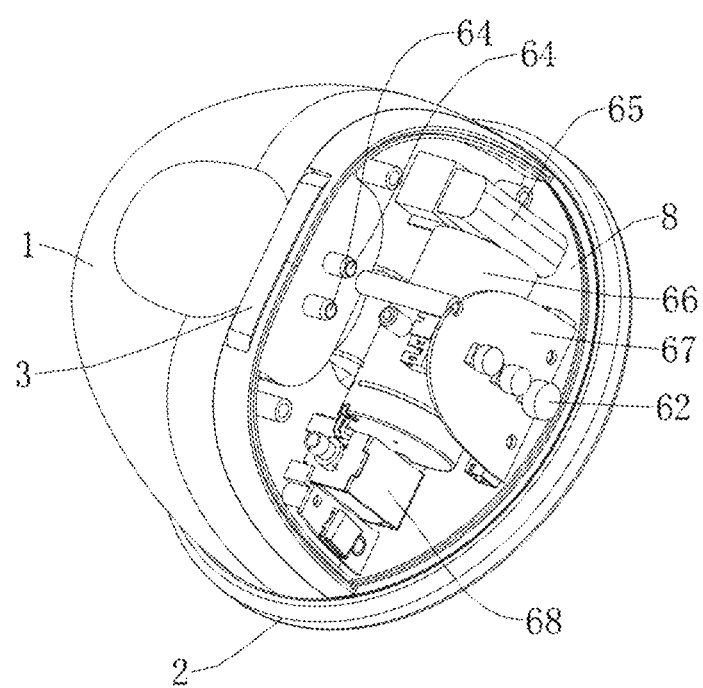
FIG. 13 is a schematic structural diagram of the breast pump with a shell removed in the present disclosure.
Figure 14:
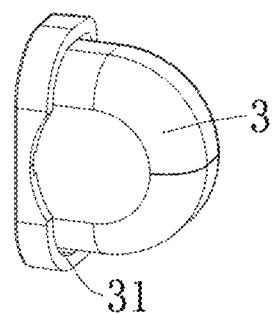
FIG. 14 is a schematic structural diagram of an airbag in the present disclosure.
Figure 15:
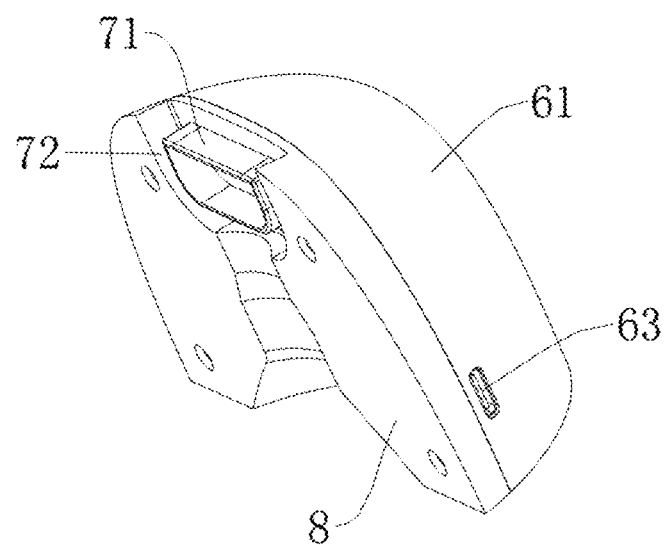
FIG. 15 is a schematic structural diagram of a main unit in the present disclosure.

With reference to FIG. 13, on the basis of the above solution, the operation key module 62 includes, but is not limited to, an on-off key, a plus key and a minus key, which may be set accordingly according to actual requirements.

The power supply 65 may be a dry battery, a lithium battery, etc. As a preferred solution, the battery is a lithium battery, the lithium battery is connected to a charging port 63 for charging through a charging line, and a port of the power supply 65 is disposed on the shell 61 of the main unit 6.

The negative pressure device 66 is not limited to one type, as long as an existing device which may evacuate the air in the airbag 3 falls within the protection scope of the present disclosure. The negative pressure device 66 itself is the existing device without any improvement, so details are not described herein again. When the airbag 3 is in a negative pressure state and needs to be restored, the internal air release valve 68 is used for filling the airbag 3 with air.

The present disclosure is further described below in conjunction with the principle of operation:

With reference to FIG. 1 to FIG. 15, a user puts the pumping nozzle 2 on the breast and turns on the on-off key, then the negative pressure device 66 starts evacuating the airbag 3, and a degree of evacuating may be adjusted by means of the plus key and the minus key, so as to adjust pumping force of the pumping nozzle 2 on the breast; the pumped breast milk enters the milk flowing port by means of the milk pumping port 51, the duckbill valve 4 is in a tightly closed state under the action of negative pressure, then after air enters the airbag 3 through the air release valve 68, the negative pressure disappears, and the breast milk flows into the milk storage cavity 11 along the duckbill valve 4. The above steps are re-executed, then after pumping of the breast milk, the pumping nozzle 2 is removed from the milk bowl, the milk outlet is opened, the breast milk is poured out, and the pumping nozzle 2 and the bowl body of the milk bowl are cleaned. Because the whole front end face of the milk storage cavity 11 is the relatively large milk outlet, thus facilitating cleaning of the milk storage cavity 11.

The present disclosure is not limited to the foregoing alternative embodiments, any other forms of products can be derived by anyone under the enlightenment of the present disclosure, but any technical solution falling within the scope defined by the claims of the present disclosure shall fall within the protection scope of the present disclosure regardless of any change in shape or structure.

The invention claimed is:

1. A milk bowl for a breast pump, characterized by comprising a bowl body, wherein a milk storage cavity and a tee joint are disposed in the bowl body, a milk outlet is disposed at a front end of the milk storage cavity, and the tee joint is located in the milk storage cavity; three ports of the tee joint are a milk pumping port, a milk flowing port and a negative pressure port respectively, and the negative pressure port of the tee joint and the bowl body are integrated; the bowl body is composed of an upper panel, a lower arc plate and a rear end plate; and a semicircular mounting plate extends upward from the milk outlet.

2. The milk bowl for a breast pump according to claim 1, characterized by further comprising a pumping nozzle, wherein the pumping nozzle is in a shape of a horn reduced from front to back, and a rear port of the pumping nozzle is hermetically connected to and in communication with the milk pumping port of the tee joint; and a front end of the pumping nozzle is detachably connected to a front end of the bowl body, and the pumping nozzle hermetically blocks the milk outlet of the milk storage cavity.

3. The milk bowl for a milk pump according to claim 2, characterized in that an edge of the semicircular mounting plate and a front edge of the lower arc plate together form an annular edge, and the front end of the pumping nozzle is detachably connected to the annular edge of the bowl body.

4. The milk bowl for a milk pump according to claim 3, characterized in that the tee joint is located at a junction of the upper panel and the rear end plate; an opening of the milk pumping port is disposed forward; an opening of the milk flowing port is disposed obliquely downward, horizontally forward or vertically downward; an opening of the negative pressure port faces upward and penetrates the upper panel, an opening edge of the negative pressure port and the upper panel are integrated, an interior of a rear end face of the negative pressure port and the rear end plate are integrated, and the milk pumping port and the milk flowing port are suspended in the milk storage cavity; and the negative pressure port is internally provided with an airbag slot.

5. The milk bowl for a milk pump according to claim 3, characterized in that the annular edge is folded outward to form an annular convex edge, an edge of the front end of the pumping nozzle is folded outward to form an annular clamping recess with a U-shaped cross section, and the annular clamping recess is hermetically clamped on the annular convex edge; a receding recess matching an outer wall of the pumping nozzle is disposed on each of the front surface of the semicircular mounting plate and the inner surface of the upper panel of the bowl body;
the pumping nozzle is made of elastic rubber; and a gap is reserved between the pumping nozzle and an inner wall of the bowl body.

6. The milk bowl for a milk pump according to claim 1, characterized in that a one-way diaphragm valve is disposed at the milk flowing port of the tee joint.

7. The milk bowl for a milk pump according to claim 1, characterized in that a duckbill valve made of rubber is disposed on the milk flowing port of the tee joint.

8. A breast pump, characterized by comprising the milk bowl for a breast pump according to any one of claims 3 to 6 and a main unit, wherein the main unit comprises a shell; the main unit is disposed in a space formed by a rear side of a semicircular mounting plate and an upper side of an upper panel of a bowl body, and the shell of the main unit and the bowl body together form a hemispherical surface.

9. The breast pump according to claim 8, characterized in that the main unit further comprises an L-shaped mounting seat composed of a front panel and a bottom panel, the front panel of the mounting seat is attached to the semicircular mounting plate of the bowl body, and a bottom surface of the L-shaped mounting seat is attached to the upper side of the upper panel of the bowl body;
a mounting cavity is formed between the mounting seat and the shell, and a control main board, a power supply, a negative pressure device, an air release valve and an airbag are disposed in the mounting cavity; an opening is provided at an upper end of the airbag, the opening is folded outward with a circle of elliptical clamping recess with a U-shaped cross section, and the elliptical clamping recess at the opening of the airbag is clamped at an upper end edge of an opening of a negative pressure port; a pressure frame is disposed on a lower surface of the mounting seat, a groove is provided around the pressure frame, the pressure frame is hermetically inserted in the opening of the airbag and the upper end of the airbag is hermetically inserted in the groove; an air pipe of the air release valve and an air pipe of the negative pressure device pass through the pressure frame to be in communication with an interior of the airbag;
the power supply, the negative pressure device and the air release valve are all connected to the control main board, and an operation key module located on an upper surface of the shell is disposed on the control main board;
the airbag is located in the negative pressure port and seals the opening of the negative pressure port.

10. The breast pump according to claim 9, characterized in that the operation key module comprises an on-off key, a plus key and a minus key, the power supply is a lithium battery, and the lithium battery is connected to a power port.

* * * * *